United States Patent
Nagarajan et al.

(10) Patent No.: US 10,981,272 B1
(45) Date of Patent: Apr. 20, 2021

(54) ROBOT GRASP LEARNING

(71) Applicant: X Development LLC, Mountain View, VA (US)

(72) Inventors: Umashankar Nagarajan, Santa Clara, CA (US); Devesh Yamparala, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 319 days.

(21) Appl. No.: 15/845,324

(22) Filed: Dec. 18, 2017

(51) Int. Cl.
*G05B 19/18* (2006.01)
*G05B 19/04* (2006.01)
*B25J 9/16* (2006.01)

(52) U.S. Cl.
CPC ............. *B25J 9/163* (2013.01); *B25J 9/1612* (2013.01); *B25J 9/1669* (2013.01); *B25J 9/1682* (2013.01); *B25J 9/1697* (2013.01)

(58) Field of Classification Search
CPC ........ B25J 9/163; B25J 9/1612; B25J 9/1669; B25J 9/1682; B25J 9/1697
See application file for complete search history.

(56) References Cited

U.S. PATENT DOCUMENTS

| | | | |
|---|---|---|---|
| 4,884,216 A | 11/1989 | Kuperstein | |
| 5,673,367 A | 9/1997 | Buckley | |
| 9,346,163 B2 | 5/2016 | Okazaki | |
| 9,384,443 B2 | 7/2016 | Passot et al. | |
| 9,669,543 B1* | 6/2017 | Stubbs | H05K 999/99 |
| 2015/0258682 A1 | 9/2015 | Izikevich et al. | |
| 2016/0207198 A1* | 7/2016 | Willfor | B25J 9/1676 |
| 2017/0213070 A1 | 7/2017 | Aghamohammadi et al. | |
| 2017/0252922 A1* | 9/2017 | Levine | G06N 3/0454 |
| 2019/0005374 A1* | 1/2019 | Shankar | B25J 9/1671 |
| 2019/0152055 A1* | 5/2019 | Abe | B25J 9/161 |
| 2019/0361672 A1* | 11/2019 | Odhner | B25J 9/1697 |

OTHER PUBLICATIONS

Amor et al. "Generalization of Human Grasping for Multi-Fingered Robot Hands," IEEE/RSJ International Conference on Intelligent Robots and Systems, Oct. 2012, 8 pages.
Cai et al. "Understanding Hand-Object Manipulation with Grasp Types and Object Attributes," Robotics: Science and Systems, Jun. 18, 2016, 10 pages.
Feix et al. "The GRASP Taxonomy of Human Grasp Types," IEEE Transaction on Human-Machine Systems 46.1, Feb. 2016, 12 pages.

(Continued)

*Primary Examiner* — Harry Y Oh
*Assistant Examiner* — Sohana Tanju Khayer
(74) *Attorney, Agent, or Firm* — Fish & Richardson P.C.

(57) ABSTRACT

Methods, systems, and apparatus, including computer-readable media, for robot grasp learning. In some implementations, grasp data describing grasp attempts by robots is received. A set of the grasp attempts that represent unsuccessful grasp attempts is identified. Based on the set of grasp attempts representing unsuccessful grasp attempts, a grasp model based on sensor data for the unsuccessful grasp attempts. After training the grasp model, a performance level of the trained grasp model is verified based on one or more simulations of grasp attempts. In response to verifying the performance level of the trained grasp model, the trained grasp model is provided to one or more robots.

20 Claims, 4 Drawing Sheets

(56) References Cited

OTHER PUBLICATIONS

Leon et al. "Chapter 2: Robot Grasping Foundations," From Robot to Human Grasping Simulation, Springer International Publishing, Copyright 2014, 18 pages.

Miller et al. "From Robotic Hands to Human Hands: A Visualization and Simulation Engine for Grasping Research," Industrial Robot: An International Journal 32(1) Feb. 2005, 8 pages.

Romero et al. "Human-to-Robot Mapping of Grasps," Proceedings of IEE/RSJ International Conference on Intelligent Robots and Systems, WS on Grasp and Task Learning by Imitation, Sep. 2008, 8 pages.

\* cited by examiner

ROBOT GRASP LEARNING

BACKGROUND

Robots may interact with their surroundings by attempting to grasp, grip, and hold objects. In some cases, a robot will attempt to grasp an object, but fail to grip it securely or disturb other nearby objects while grasping the desired object.

SUMMARY

In some implementations, a fleet of robots may be configured to interact with objects in their surroundings. For example, a robot may identify an object, such as a cup or a bottle, in its surroundings, then use an attached electromechanical actuator (e.g., a robot arm or hand) to grasp and hold the object. The robot may also include various sensors that detect and record physical phenomenon associated with an attempt to grasp an object, e.g., video cameras that capture images of the grasp attempt, force sensors that record the contact force between the robot and the object, etc. In some cases, a computer system of the robot may determine the control parameters for the grasp using a neural network grasp model. The neural network grasp model may be implemented within the computer system of the robot and use various input data, including data from the sensors and information about the object, to determine the parameters necessary to cause the robot to grasp the object.

Not all grasps attempted by robots are successful. In some cases, when attempting to grasp an object, a robot may fail to grip the object securely (e.g., drop the object or miss the object entirely) or grip the object too firmly (e.g., deform the object). In other cases, a robot may encounter an object in a complex setting, for example, where the object of interest is surrounded by other objects. In attempting to grasp the object of interest, the robot may disturb other nearby objects or grasp an incorrect object. These failed grasp attempts by the robot may be used to train and update the robot's neural network grasp model. To improve the grasping ability of an entire fleet of robots, the failed grasp attempts of many robots can be collected and used to train a model that is distributed to the fleet.

In some implementations, a robot may send some or all of the sensor data related to one or more failed grasp attempts to a remote server system. The server system may retrospectively analyze and simulate the failed grasp attempts to generate an updated grasp model. The updated grasp model may then be sent to the robot, as well as to other robots in the fleet. In some implementations, the server system's analysis may include annotating the failed grasp attempt data, augmenting the data, then using the augmented annotated data to train and update the neural network grasp model. After updating the grasp model, the server system may test the model to verify that previous errors are not repeated. For example, the server system may simulate the failed grasp attempt using the data provided by the robot to verify that the updated model results in a successful grasp. In some cases, the server system may iterate the analysis process, e.g., augmenting data, training a model, and simulating scenarios repeatedly until the system generates a satisfactory updated grasp model.

The server system may then distribute the updated neural network grasp model to one or more robots in the fleet. In some implementations, the server system may distribute the updated grasp model to a robot in the fleet that is different from than the one that provided the failed grasp attempt data.

In some implementations, the server system may distribute different updated grasp models to different robots in the fleet. The server system may compare the grasp performance of robots implementing different models to determine the optimal training parameters and algorithms.

The techniques and systems disclosed herein may provide one or more of the following advantages. By using a grasp model that has been updated based on retrospective analysis and simulation of failed grasp attempts and shared by other robots in the fleet, a robot can more quickly learn to successfully grasp diverse objects without having to individually train on each object or object class. Using grasp attempts derived from more than one robot may diversify the training data set for the grasp model, enhancing the model's fidelity and breadth of applicability. By performing model training using a remote server system rather than within the computing system of an individual robot, greater computational resources can be applied to the training process, speeding the time required to update the model and reducing the on-board computing requirements for the robot. Similarly, performing computationally intensive tasks remotely allows the server system to use more complex processing techniques during retrospective analyses, for example, using a larger and more complex model for analysis, enabling better training and performance of the updated grasp model distributed to the fleet of robots. By training and verifying the grasp model using augmented grasp attempt data, for example, grasp attempt data to which noise has been added or intensity levels adjusted, the grasp model may be made more robust, improving robot grasp performance in situations that differ from past grasp attempts.

In some implementations, the disclosed techniques may include a method performed by one or more computers, where the method includes (a) receiving, by the one or more computers, grasp data describing grasp attempts by robots, where the grasp data includes, for each grasp attempt, (i) sensor data from a robot that describes an attempt of the robot to grasp an object and (ii) an indication of a type of grasp attempted by the robot; (b) identifying, by the one or more computers, a set of the grasp attempts that represent unsuccessful grasp attempts by the robots; (c) based on the set of grasp attempts representing unsuccessful grasp attempts, training, by the one or more computers, a grasp model based on the sensor data for the unsuccessful grasp attempts; (d) after training the grasp model, verifying, by the one or more computers, a performance level of the trained grasp model based on one or more simulations of grasp attempts using outputs that the trained grasp model generates in response to receiving inputs derived from the sensor data for one or more unsuccessful grasp attempts; and, (e) in response to verifying the performance level of the trained grasp model, providing, by the one or more computers, the trained grasp model to a robot.

In some implementations, receiving the grasp data includes receiving grasp data, over a communication network, from each of multiple robots that use a same grasp model, where the grasp data includes an indication of outputs of the grasp model for each of the grasp attempts. In some examples, training the grasp model includes updating the training of the grasp model used by each of the multiple robots to generate an updated grasp model. In some examples, verifying the performance level of the trained grasp model includes, for a particular unsuccessful grasp attempt indicated by the received grasp data, comparing (i) output of the updated grasp model generated using the sensor data for the particular grasp attempt with (ii) output of the grasp model indicated by the received grasp data for the particular grasp attempt.

In some implementations, the grasp model may be configured to process input data comprising feature values derived from sensor observations of an object and to provide output indicating (i) a grasp type selected from among multiple types of grasps and (ii) a region for contact with the object when grasping the object. In some implementations, to indicate a region for contact with an object, the grasp model is configured to output data specifying a bounding box on an image of the object and the grasp data includes, for each of the grasp attempts, the grasp model output indicating the grasp type and the bounding box.

In some implementations, the grasp model includes a convolutional neural network.

In some implementations, for each of the grasp attempts, the sensor data for an attempt to grasp an object includes sensor data acquired by sensors of the robot attempting the grasp that indicates a position of the object grasped before and after the grasp attempt. In some examples the sensor data for the attempt to grasp the object indicates one or more sensor readings acquired by the robot attempting the grasp during the attempt to grasp the object.

In some implementations, the method includes identifying the set of the grasp attempts that represent unsuccessful grasp attempts by the robots by determining that a particular grasp attempt of a robot to grasp a target object was unsuccessful based on determining, using the sensor data for the grasp attempt, that (a) the robot did not contact the target object, (b) the robot grasped an object that is different from target object, (c) the robot contacted the target object but did not lift the target object, (d) the target object slipped out of the grasp before the robot acted to release the target object, (e) a pattern of force or contact sensors does not represent a stable grasp, (f) the robot displaced one or more objects near the target object, or (g) the robot deformed or displaced the target object as a result of the grasp attempt.

In some implementations, the method includes identifying the set of the grasp attempts that represent unsuccessful grasp attempts by determining that a particular grasp attempt of a robot to grasp a target object was unsuccessful based on (a) data indicating feedback from a user to the robot indicating that the grasp attempt was unsuccessful, (b) data indicating a user repeating an instruction for the robot to perform the grasp after the grasp attempt, or (c) data indicating an instruction from a user to the robot to abort a task that involves the grasp attempt.

In some implementations, the method includes verifying the performance level of the trained grasp model by (a) simulating a grasp attempt, with grasp characteristics determined using the trained grasp model, for grasping a same object in a same environment as a particular grasp attempt described by the grasp data and (b) determining that the simulated grasp attempt is more likely to produce a successful grasp than the particular grasp attempt indicated in the received grasp data.

In some implementations, verifying the performance level of the trained grasp model includes (a) determining, from the sensor data for a particular grasp attempt that is an attempt of a robot to grasp a target object in an environment, parameters describing the environment or a relationship between the robot and the target object, (b) altering the parameters describing the environment or a relationship between the robot and the target object, (c) simulating a grasp attempt of a robot, using grasp characteristics determined using the trained grasp model, to grasp the target object from an altered environment based on the altered parameters describing the environment or altered relationship between the robot and the target object; and (d) evaluating a likelihood of success of the simulated grasp attempt.

In some implementations, the method may verify the performance level of the trained grasp model by (a) altering sensor data for a particular grasp attempt to (i) degrade the quality of the sensor data, (ii) introduce noise or randomness, (iii) increase error or variation in the sensor data, (iv) apply one or more image transformations to image data of the sensor data, (v) at least partially occlude a target object to be grasped, (vi) change relative positions of objects described by the sensor data, or (vii) change a position of the target object relative to a robot and (b) simulating a grasp attempt of the target object by a robot using grasp characteristics determined using the trained grasp model.

In some implementations, the method further includes training the grasp model; determining, based on simulations of grasp attempts using the trained grasp model that are carried out based on the sensor data for the unsuccessful grasp attempts, that the trained grasp model does not provide at least a minimum level of performance; and, based on determining that the trained grasp model does not provide at least the minimum level of performance, continuing to train the grasp model.

In some implementations, the method further includes providing the trained grasp model to each of multiple robots with an instruction to replace a previous grasp model of the multiple robots with the trained grasp model.

In some implementations, the sensor data for a grasp attempt includes one or more images captured during the grasp attempt, video data showing the grasp attempt, audio data indicating sounds occurring during the grasp attempt, force sensor readings occurring during the grasp attempt, lidar data captured during the grasp attempt, or radar data captured during the grasp attempt.

In some implementations, the grasp data for a grasp attempt includes metadata indicating outputs of one or more models of the robot, a trajectory or path the robot determined for reaching the object to be grasped, one or more scores indicating an evaluation of grasp characteristics by the robot, or an estimated pose of the object to be grasped that is determined by the robot.

Implementations of the disclosed techniques may include hardware (e.g., a system including one or more computers), a method or process implemented at least partially in hardware, or a non-transitory computer-readable media storing instructions that, when executed by one or more computers, cause the computers to perform operations that carry out the disclosed techniques. The details of one or more implementations are set forth in the accompanying drawings and the description below. Other features will be apparent from the description and drawings, and from the claims.

DETAILED DESCRIPTION

Figure 1:
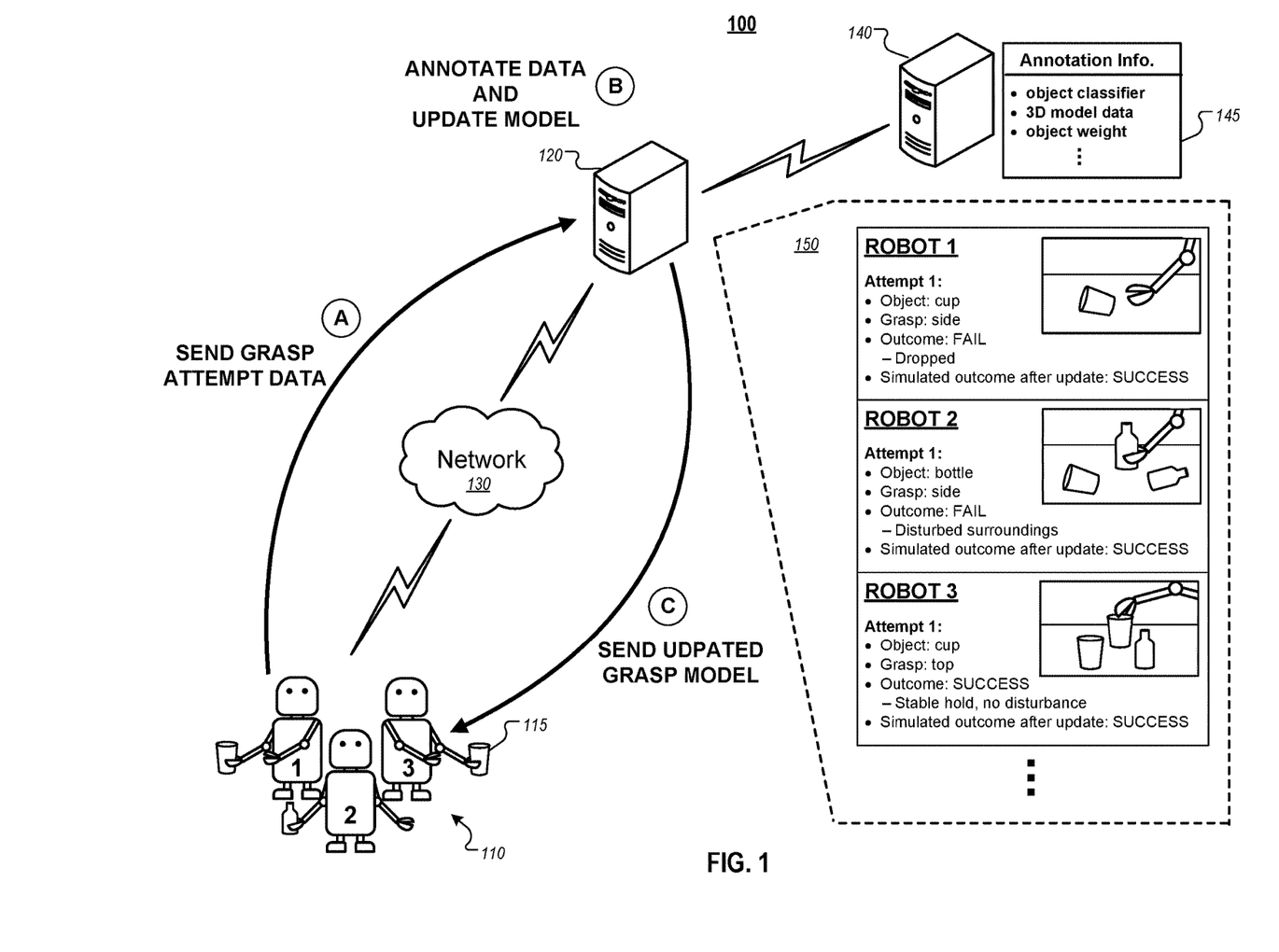
FIG. 1 is a diagram that illustrates an example system for robot grasp learning.

FIG. 1 is a diagram that illustrates an example system 100 for robot grasp learning. The system 100 includes robots 110, a server system 120, a communication network 130, and an additional data source 140. FIG. 1 also illustrates stages (A) through (C), which represent a flow of data.

The server system 120 can perform retrospective analysis and simulation of failed grasp attempts based on data shared by multiple robots. The server system 120 can train a grasp model in a manner that incorporates information gained from the varied situations and conditions encountered by all of the robots 110. In the system 100, one or more robots in a fleet of robots are equipped with an actuation capability that enables them to interact with objects in their surroundings. In particular, a robot 110 may attempt to grasp an object, for example to lift, lower, rotate, or move the object from one position to another.

In some implementations, when attempting to grasp an object, robots 110 generate grasp parameters which may include, for example, a type of grasp to use for an object, a location on the object to initiate contact, an amount of force to apply during the grasp, a trajectory or approach for moving an actuator to the object, and so on. The robots 110 may determine these and other parameters for carrying out a grasp using a grasp model that may be stored locally in an on-board computing system of the robot 110. For example, the grasp model may include a neural network that has been trained to output grasp parameters in response to input information about a grasping task, e.g., sensor data describing the object, data indicating a location or pose of the object, a classification of the object, etc.

In some instances, a robot 110 may attempt to grasp an object, but fail to hold the object as intended. For example, the robot 110 may not apply sufficient pressure to achieve a firm grip, causing the object to drop, or the robot 110 may apply too much pressure, causing the object to deform. Robots 110 may send data describing grasp attempts and their outcomes to the server system 120, which can collect the data and use it to improve the performance of the grasp model. For example, the server system 120 may annotate and analyze the data, and update the neural network grasp model by training the neural network grasp model on the data. The server system 120 can also simulate the previously failed grasp using the updated model to verify that the model has improved to be able to correctly perform the grasp that was previously unsuccessful. The server system 120 may also perform simulations for variations of the scenarios previously encountered by the robots 110. For example, the server system 120 can alter or augment the sensor data used by the grasp model, for example, by adding noise or random changes, or by altering parameters of the task. By simulating variations of the original unsuccessful grasp using the augmented data, the server system 120 can ensure the robustness of the grasp model under a wider range of conditions. If appropriate, the server system 120 can then train or update the model further based on the simulation results to enhance model robustness. After updating the neural network model, the server system 120 may distribute the updated grasp model to one or more robots 110 in the fleet, effectively allowing all the robots 110 to learn improved grasping behavior from the collective experience of the fleet.

A robot 110 refers generally to a computing device that has an actuation capability enabling it to interact with its surroundings. As discussed further below, a robot 110 typically has sensory capabilities, e.g., an image sensor, an audio microphone, lidar, radar, or other sensors. Robots 110 also often include a locomotion system, such as motorized legs, wheels, or treads, that allow the robot 110 to travel from one place to another. The actions and functions of the robot 110 may be controlled by a programmable embedded or external computing system. In some implementations, the robot 110 may function autonomously or semi-autonomously, determining and performing at least some actions without input from a human user, or with only limited input from a human user. For example, a robot 110 may be configured to receive a task from a user, e.g., in the form of a voice command, and the robot 110 may interpret the voice command, determine actions needed to carry out the task, and then act to perform the task requested. Robots 110 may be used for a variety of applications and in a variety of roles and settings, including manufacturing, medical care, personal assistance, commercial environments, and other applications.

The robot 110 may include an actuator that enables the robot to physically interact with its surroundings. In some implementations, the actuator enables the robot 110 to grasp objects in its environment. The actuator may be, for example, an electromechanical robotic hand. Although the robotic hand may have a very different form than a human hand, it may nevertheless permit motions similar to those of a human hand, such as opening, closing, lifting, lowering, rotating, curling, and pinching. In some implementations, the actuator is more simple, such as two elements with a variable distance to engage or release an object located between the elements. The actuator may be electronically controlled by a control module of the robot 110, which provides motor commands to the actuator to induce motion, change the actuator's pose, and execute the grasp. In FIG. 1, the robot 110 has a robotic hand actuator.

The robot 110 may also include sensors that collect and record data from the robot's surroundings. The robot 110 may be equipped with sensors such as video or still image cameras, stereo cameras or other cameras for obtaining depth information, visible light detectors, force sensors, IR detectors, proximity sensors, contact sensors, pressure sensors, audio detectors, accelerometers, gyroscopes, GPS systems, radar systems, and/or light detection and ranging (LIDAR) systems.

A robot 110 may include a computing system that includes computer hardware, such as a processor, a chipset, memory, or data storage. This computing system may be integrated with the robot so it travels with the robot 110. In some cases, the robot 110 may include embedded systems based on microcontrollers, field programmable gate arrays (FPGAs), or application specific integrated circuits (ASICs). The computing system of the robot 110 may include one or more memory systems. The computer hardware of the robot 110 may be configured to execute software that controls the movements and processes of the robot 110. The computing system of the robot may communicate with or receive instructions from other computing systems, including remote computing systems that communicate over the network 130.

In some implementations, portions of the computing system of the robot 110 may be configured as modules that control functions related to grasping. The modules may be configured in software, hardware, or any combination of software and hardware. For example, the computing system of the robot 110 may be configured to include a classification module. The classification module may accept, as input, information related to an object in the robot's surroundings, e.g., images or video of an object, or estimated dimensions of an object. The classification module may associate the identified object with a particular object class, e.g., to label the object as a cup, pen, chair, or other type of object. The classification module may be implemented as a machine learning model, such as a neural network.

The computing system of the robot 110 may also include other modules. For example, the system may include a location processing module, which determines the location and orientation of an identified object in 3D space. Based on the determined location and orientation of the object, the location processing module or another module may select a grasp type, e.g., side grasp, top grasp, pinch grasp, etc., and a position of the robotic hand for grasping the object.

In some implementations, the computing system of the robot 110 may include a grasp model, which determines one or more parameters for carrying out a grasp of an object. In particular, the grasp model may process information about the environment of the robot 110 and a grasping task that is requested, and may output parameters that specify how a particular object in the current environment should be grasped. For example, a grasp model may be trained to receive information that indicates a target object to be grasped, a position of the target object, and a classification (e.g., object type) of the target object, along with data indicating an image showing at least a portion of the target object. From this information and potentially other input information, the grasp model may determine a bounding region, e.g., a box or other area, where the robot 110 should contact the target object. An appropriate grasp model output may thus specify a region of an image, on a portion of the image representing the target object, where an actuator of the robot 110 can contact the target object to form a stable grasp that allows controlled manipulation of the target object.

The grasp model may provide other parameters for carrying out the grasp. For example, the grasp model may indicate a grasp type, e.g., a side grasp in which the robotic hand engages sides of the object, a top grasp in which the robotic hand approaches from above the object, or a pinch grasp in which the robotic hand pinches a specific portion of the object. Similarly, the grasp model may indicate a direction or path to move the robotic hand to approach the object to carry out the grasp. As another example, the grasp model may indicate a position of the robotic hand, e.g., a gap spacing between finger elements, for engaging the object.

As additional examples, the grasp parameters may include control parameters that indicate the position and/or movement of the robot 110 or components of the robot 110 during the grasp attempt. For example, the grasp parameters may specify the speed, direction, and extent of motion of the robot's fingers during the grasp. The parameters may specify an amount of force to be applied or an amount or distribution of contact area to achieve when grasping the object. Estimated trajectories or other data to facilitate the grasp of the object may also be provided. Once output by the grasp model, the grasp parameters may be stored in a computer system of the robot 110, e.g., in a memory system of the robot 110. The grasp parameters may represented in any of various forms, such as scores, probabilities, selections from a set of options, physical quantities (e.g., voltages, currents, or resistances), and so on.

The computing system of the robot 110 also may include a control module, which provides the commands to the actuator necessary to execute a grasp. The commands may also be output as electronic control signals (e.g., voltages, currents, or resistances) that induce motion in the electromechanical actuator or robotic hand.

The robot 110 may also include modules configured to perform other functions, including, but not limited to, sensor data collection, data conditioning, image processing, signal processing, communication, and robot navigation.

In some implementations, one or more computing functions or modules of the robot 110 may be implemented through neural network computing architectures. Neural networks can include interconnected computing nodes (i.e., neurons) are organized in layers, with configurable connections (i.e., synapses) between nodes in adjacent layers. The neural networks may also be recurrent, where nodes are connected to other nodes within a layer or include a memory element. The neural network may be locally connected, where each node is connected to a only limited number of nodes in adjacent layers, or it may be fully-connected, where each node is connected to every node in an adjacent layer. In some cases, the neural network may be a convolutional neural network.

The functionality of a neural network may be determined by setting parameters of the network including the value and configuration of the node interconnectivity (i.e., synaptic weights). The neural network parameters may be set by training the network on a variety of data using any of various learning rules, e.g., to minimize a cost function in order to achieve a desired result, such as parameters describing an appropriate grasp. The training may be supervised or unsupervised, and may include feed-forward approaches, back propagation, Hebbian learning, or other machine learning or deep learning techniques.

For example, the robot may use a neural network grasp model, which accepts input data, such as a classification of a target object and a grasp type, and outputs parameters that enable the robot 110 to execute the grasp. As noted above, these parameters may include data that specifies a contact region for engaging the target object. This may be expressed as a bounding box or other designated bounding region specifying the region on the target object where the robot's actuator may appropriately contact or extend around the target object during the grasp. In some implementations, multiple robots 110 may use the same neural network grasp model, with the same training state or internal parameter values in the model. In particular, multiple robots 110 that possess the same hardware and software configurations, as well as the same mechanical features (e.g., same actuator design) may use identical neural network grasp model to determine appropriate parameters a grasp.

In some implementations, the computing modules of the robot 110 may be configured to enable the robot 110 to identify and grasp a specific object 115 in the robot's surroundings. For example, a computer system of the robot 110 may receive images of the robot's surroundings and analyze those images to identify an object 115. The classification module may determine that the object 115 is a cup. The robot 110 may determine that the object 115 should be grasped as part of an ongoing task, such as cleaning or organizing dishes, or based on a user command, e.g., a voice command such as "bring me the cup."

The location processing module may determine that the object 115 is sitting upright on a table three feet in front of the robot 110 and that a side-grasp of the robotic hand is appropriate to grasp the object 115. The grasp model may then determine a region of the cup where the robotic hand of the robot 110 should engage the object 115. In some implementations, the grasp model may be configured to indicate robot movements or other parameters that enable the robot 110 to grasp the object 115. Using the outputs of the grasp model, the control module generates and send motor commands inducing the robot 110 to carry out movements that attempt to grasp the object 115.

Sensors of the robot 110 may record data throughout the grasp attempt, e.g., before, during, and after the actual grasping motion occurs, and the sensor data may be stored in a memory system of the robot 110. For example, the camera of the robot 110 may capture video of the robot's attempt to grasp the object 115, recording the movement of the robotic hand toward the object 115 and the robotic hand closing to carry out the grasp, as well as a period of time before and after the grasp occurs. The robot 110 may also record other sensor data that provides feedback on the grasp process. One or more force sensors may record the detected force between the robotic hand and the object 115 throughout the grasp attempt. Data from accelerometers, gyroscopes, or other sensors may be recorded to provide information on the position, orientation, or movement of the robot 110 or components of the robot 110 throughout the grasp attempt. In addition to recording sensor data for the grasp attempt, the robot 110 may record outputs of the various modules, e.g., the object classification module, the location processing module, the control module, etc., and even the inputs provided to these modules. This information about the inputs and outputs for the modules can provide enhanced context that can be used to later determine whether a grasp attempt failed due to an error by the grasp model or another module of the robot.

In some implementations, sensor data recorded during the grasp attempt may be used to determine whether the grasp attempt was successful. For example, a computing system of the robot 110 may analyze video images, force sensor data, or proximity sensor data captured during the grasp attempt to determine if the robot 110 successfully grasped the object 115, e.g., did the robot grasp the object 115 without dropping it, deforming it, or disturbing other objects. In some implementations, a computer system other than that of the robot 110 may analyze the grasp attempt data to determine the success of the grasp attempt. In some implementations, a human user may review the grasp attempt data to determine whether the grasp attempt was successful.

The robot 110 may electronically communicate with a server system 120. The server system 120 may be, for example one or more computers, servers, mainframe, or other computing platform. The server system 120 may include distributed computing architectures. For example, the server system 120 may be a high-performance computing cluster (HPCC). In some implementations, the server system 120 may be a cloud computing system.

In some implementations, the robots 110 may communicate with the server system 120 through the network 130. The network 130 may be any communication infrastructure that supports the two way exchange of data between the server system 120 and the robots 110. The network 130 may include a local area network (LAN), a wide area network (WAN), the Internet, or other network topology. The network 130 may be any one or combination of wireless or wired networks and may include Ethernet, cellular telephony, and Wi-Fi technologies. Communications through the network 130 may be implemented through any one or combination of various protocols, including 802.11, Bluetooth, GSM, 3G, 4G, 5G, LTE, or other custom or standard communication protocol. In some implementations, the network 130 may include optical data links.

Referring still to FIG. 1, in stage (A), one or more robots 110 send grasp data to the server system 120. The grasp attempt data can represent attempts by the robots 110 to grasp objects. The robots 110 can provide grasp data for many different grasp attempts, and for attempts to grasp different types of objects. When a robot 110 attempts a grasp, the robot 110 may send the grasp attempt data soon after the attempt on an individual basis, or a robot 110 may store grasp attempt data for several attempts and send a data package describing multiple attempts at a later time.

Although the object 115 illustrated in FIG. 1 is a cup, the objects that are the subject of grasp attempts may be any item that a robot 110 has attempted to grasp. The grasp attempt data sent by the robot 110 may include sensor data recorded before, during, and/or after the grasp attempt, for example, data captured by cameras, force sensors, IR sensors, contact sensors, or a LIDAR detector. The grasp data may also include information such as: (i) a log of the motor commands executed by the robot 110 during the grasp attempt, (ii) the object classification, grasp type (e.g., side grasp, top grasp, pinch grasp, etc.) or other information used by the processor of the robot 110 to determine the motor commands, (iii) inputs to or outputs to modules of the robot 110 during the grasp attempt, (iv) feedback information such as input from a user during or after the grasp attempt, (v) task data indicating a user command or task that prompted the grasp attempt, and (vi) a log of controls, settings or other parameters related to the robot's grasp attempt.

In some implementations, the grasp attempt data may include analysis of the success or failure of the grasp, as determined by the processor of the robot 110 or by a human user. The data may also include other annotations provided by the robot 110 or a human user, such as observations related to the quality of the grasp (e.g., stable vs. precarious grip), the speed of the grasp, or other features of the grasp attempt. In some implementations, robots 110 send information about all grasp attempts, and the server system 120 evaluates whether the attempts were successful or not. This approach can enable the server system 120 to use reinforcement learning to emphasize model behavior that results in successful grasps, while improving the model to avoid unsuccessful grasps. In other implementations, robots 110 only send information to the server system 120 for grasp attempts that the robots 110 determine to represent unsuccessful attempts.

In stage (B), the server system 120 annotates the grasp attempt data and updates a grasp model based on the annotated data. In some implementations, the server system 120 may annotate the data based on analysis of information received from the robots 110. For example, the server system 120 may correlate the grasp attempt sensor data with the log of motor commands sent by the robot 110 to determine the moment of first contact between the robot's actuator and the object 115 or to determine a moment at which an object was dropped. The server system 120 may associate the data with the class of the object 115, or the grasp type (e.g., side grasp, top grasp, pinch grasp).

The server system 120 may also label the grasp attempt data as a successful or failed attempt based on analysis of the data or additional information sent by the robot 110 or provided by a human user. In some cases, the server system 120 may analyze the grasp attempt data to determine a mode of grasp failure (e.g., dropped object, deformed object, disturbance of other objects, etc.), and annotate the data with the mode of failure or annotate with other descriptors of the grasp attempt. To make this assessment, the server system 120 may perform other retrospective analyses on the grasp attempt data. For example, the server system 120 may integrate data from different sensors (e.g., video images, force sensor data, IR contact sensor data) to obtain a more comprehensive description of the grasp attempt, or the server system 120 may filter data or transform data to identify critical features of the grasp attempt. As an example, using a series of images for a grasp attempt, the server system 120 may identify objects present, and determine whether objects other than the target object to be grasped was displaced due to the robot's grasp attempt. Similarly, the server system 120 can track the position of the target object relative to the robotic hand across a sequence of images, to determine whether the target object moves with the robotic hand in a stable manner after the grasp attempt. As another example, the server system 120 may recognize speech recorded by the robot 110 and determine whether a user expressed disapproval (e.g., "no," "the other cup," "try again," etc.).

In some implementations, the server system 120 may annotate the data with additional annotation information 145 from one or more secondary sources 140, which may be, for instance, a database, a database server, a personal computer, a mobile computing device, or other electronic device. For example, the secondary source 140 may provide information 145 related to the object 115 or the class of objects to which object 115 belongs, such as a 3D model data for the object being grasped, a weight distribution for the object, a material composition of the object, or other data. In some cases, the secondary source 140 may provide information 145 related to the robot 110, such as its location, activity or grasp attempt history, or relationship to other robots 110. In some cases, the secondary source 140 may provide feedback from a human user, for example, determination of success or failure of the attempt, or a measure of the quality of the grasp, provided by a user who viewed the grasp attempt. The server system 120 may use any or all of the information received from the secondary sources 140 to annotate the grasp attempt data.

In FIG. 1, panel 150 shows examples of grasp attempt data annotated by the server system 120. Here, the server system 120 received grasp attempt data from three robots 110 (Robot 1, Robot 2, and Robot 3) describing attempts by the robots to grasp an object. Based on the sensor and other data received from the robots 110, as well the additional information 145 provided by the secondary source 140, the server system 120 annotates each set of data with at least the following information: the class of object on which the grasp was attempted, the grasp type, the outcome of the grasp (e.g., success vs. failure), and a description of the failure mode for failed grasps.

For example, as shown in panel 150, the server system 120 annotates the grasp attempt data received from Robot 1 by associating with that data the following information: the object grasped was a cup, Robot 1 implemented a side grasp, and the grasp failed because the object dropped. The server system 120 annotates the grasp attempt data received by Robots 2 and 3 similarly. In this example, the server system 120 associates the data received from Robot 2 with information that the object grasped was a bottle, Robot 2 implemented a side grasp, and the grasp failed because the attempt disturbed objects adjacent to the object grasped. The server system 120 associates the data received from Robot 3 with the information that the object grasped was a cup, Robot 3 implemented a top grasp, and the grasp was successful because it resulted in a stable grip with no disturbance to adjacent objects.

Using the annotated grasp attempt data, the server system 120 also updates a grasp model, e.g., by training a neural network model. In some implementations, the server system 120 may update a neural network grasp model by training the model using the annotated grasp attempt data. For example, the server system 120 can use data for the unsuccessful grasp attempts as negative examples in training. For the inputs to the grasp model representing the conditions of the grasp attempt, the model outputs that resulted in the unsuccessful grasp can be specified to high cost or error, which can then be back propagated or otherwise used to update the neural network parameters.

After training, the server system 120 may simulate grasps with the updated model. This can be done by generating input to the updated model based on the sensor data or other grasp attempt data received from the robots 110, which represents an actual failed grasp attempt. In some cases, the same inputs provided to the grasp model that resulted in the prior failed grasp attempt can be provided to the updated model, and the server system 120 compares the outputs of the updated model with the outputs that the prior model produced. The server system 120 can then verify that the updated model corrects the deficiencies of the previous model or increases the likelihood of a successful grasp for the scenario. For example, where the grasp models indicate a bounding region for contact during the grasp, the server system 120 can determine whether and to what extent the bounding region indicated by the updated model is different from the bounding region for the prior model. The server system 120 may additionally or alternatively compare the bounding region indicated by the updated model to a desired bounding region where a grasp is likely to be successful, or generate a confidence score indicative of how likely it is that the new bounding region will be successful. Similarly, the server system 120 may assess the output parameters as a whole, including a trajectory or grasp type indicated by the updated model, to determine a likelihood that non-targeted objects would be displaced or that the target object would be deformed or otherwise damaged.

In some implementations, the server system 120 may create new simulation scenarios by augmenting the annotated grasp attempt data. For example, the server system 120 may add noise or randomness to sensor data used to generate inputs to the grasp model before simulating a grasp. The server system 120 may create several variations of a grasp scenario through different transformations or alterations to the sensor data. By simulating the grasp using augmented data, the neural network grasp model may be tested for a wider variety of situations and conditions. If some of the simulations result in inappropriate grasp parameters, the server system 120 can continue training the model to enhancing robustness to noise and other variations in sensor data.

In the example system 100 of FIG. 1, the server system 120 updates the neural network grasp model and simulates the grasps of Robot 1, 2, and 3 with the updated model using the grasp attempt data provided by the robots. As shown in panel 150, the simulations predict that the grasp attempts by Robot 1 and Robot 2, which failed when using the previous model, would be successful grasps if implemented using the updated grasp model. The simulations also predict that the grasp attempt by Robot 3, which was successful using the previous model, would remain successful if implemented using the updated grasp model. Part of verifying the performance of the trained grasp model can be to verify that performance is not degraded for situations where the previous model performed well. Accordingly, the server system 120 may require that the trained model provide appropriate parameters to handle a test set of environments or tasks, to ensure that performance of the grasp model for some objects or situations does not come at the expense of performance for other objects or situations.

In stage (C), the server system 120 distributes the updated neural network grasp model to one or more robots 110, for example, by sending the updated model over the network 130. The server system 120 may distribute the updated grasp model by sending some or all of the model to the robots 110. For example, in some implementations, the server system 120 may send to the robots 110 only those parameters, e.g., synaptic weights or node connectivities that changed relative to the previous model. The robot 110 may alter or replace the previous neural network grasp model stored locally on the robot 110 to instead store the updated model received from the server system 120. Using the updated grasp model, each of the robots 110 can integrate improvements learned from the failed grasps of other robots, allowing the robots 110 to more quickly learn to successfully grasp diverse types of objects without having to individually train on each object or object class.

Figure 2:
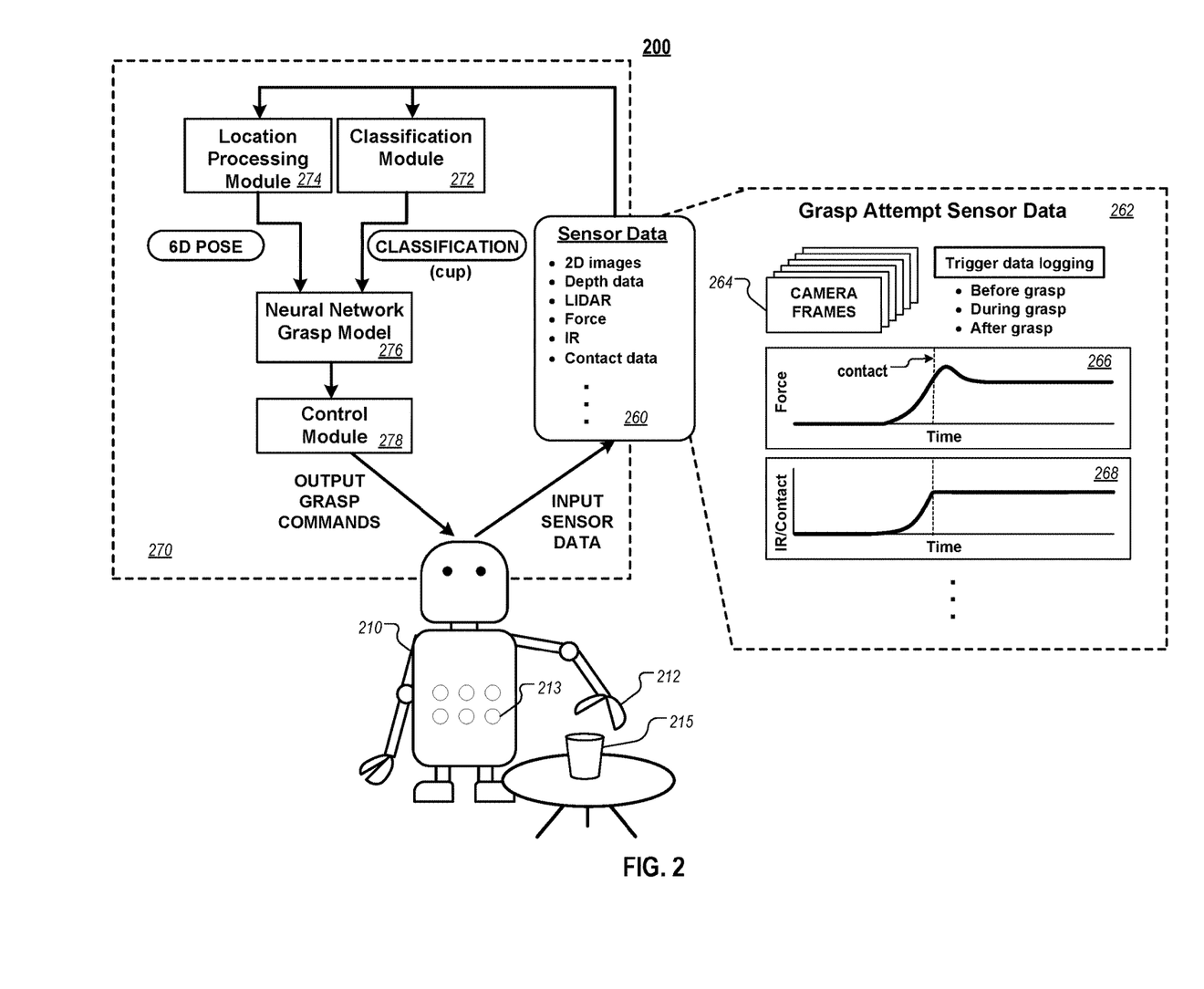
FIG. 2 is a diagram that illustrates an example robot executing a grasp.

FIG. 2 is a diagram that illustrates an example environment 200 that includes a robot 210 executing a grasp. In the example, the robot 210 collects sensor data, identifies an object to be grasped and a grasp type, determines appropriate grasp parameters, then executes the grasp based on those parameters. The robot 210 collects and records sensor data throughout (e.g., before, during, and after) the grasp attempt, which it may send to a server system for analysis and simulation.

The robot 210, like the robots 110 of FIG. 1, is a computing device that has an actuation capability enabling it to interact with its surroundings. The robot 210 includes a computing system, which includes the computer hardware and software components that perform the various functions described throughout this disclosure. For example, the robot 210 may include any one or more of a processor, a chipset, or a microcontroller. The robot 210 may include one or more graphics processing units (GPU) or special-purpose logic and processing capability, such as a field programmable gate array (FPGA) or an application specific integrated circuit (ASIC). The robot 210 may be configured to include computational processing modules tailored for specific functionality, such as a digital signal processor (DSP), image processor, or other module.

The computing system of the robot 210 may also include one or more memory systems or data storage systems. The memory system of the robot 210 may store instructions that enable the computing system of the robot 210 to execute programs that enable the functions described herein. The memory system of the robot 210 may also store other settings and data that support the execution of the described functionality. For example, the memory system may store parameters relating to a neural network, including connection parameters, synaptic weights, node parameters, layer connectivity, and other information and settings used to implement neural network computing architectures.

The robot 210 includes an electromechanical actuator that can grasp and hold objects in the robot's environment. In some implementations, the actuator may be a robotic hand, fingers, clamp, or other mechanical means for physically gripping an object. In example 200, the robot 210 includes a robotic hand 212 that can execute an action (e.g., move to a particular position in 3D space, rotate to a particular orientation, hold position, open palm, close palm, wrap fingers, etc.) in response to commands from the robot 210.

The robot 210 also includes various sensors 213 that detect and collect information from the robot's local environment. For example, the sensors 213 may include video cameras that capture images of the robot's surroundings or images of the robot's interactions with its surroundings. For example, a video camera on the robot 210 may capture images of the robotic hand 212, recording movement, grasp attempts, or other interactions of the robotic hand 212 with the robot's environment. In some implementations, the robot 210 may have more than one camera, where the multiple cameras are located in different places on the robot, such that the difference in captured images provides depth information for objects within the captured images (e.g., parallax). The sensors 213 may include one or more of other sensors, including, but not limited to, light detectors, motion detectors, and audio recorders.

The sensors 213 may be located on any part of the robot 210. In some implementations, one or more sensors 213 may be located on the robotic hand 212, where the sensors 213 detect physical properties associated with the grasp attempt. For example, the sensors 213 may include force sensors placed on the fingers or palm of the robotic hand 212 to detect and collect the force applied to the hand by an object during a grasp attempt. Similarly, the sensors 213 may include IR detectors, contact sensors, pressure sensors, cameras, or other sensors located on the robotic hand 212 that collect data related to a grasp attempt or other interactions between the robot 210 and its environment.

In some implementations, the sensors 213 may include sensors that provide the robot 210 information about the configuration and/or position of the robotic hand 212. For example, the sensors 213 may include one or more accelerometers that detect motion of the robotic hand 212. The sensors 213 may also include one or more gyroscopes that detect the orientation of the robotic hand 212, or one or more proximity sensors that detect the presence of nearby objects. In some implementations, there may be sensors 213 on the individual fingers of the robotic hand 212 that provide data that enables the robot 210 to determine the relative position of the fingers to the hand or to another portion of the robot 210.

In some implementations, the robot 210 may use sensor data 260 collected by one or more sensors 213 to cause the robotic hand 212 to attempt to grasp an object 215. For example, the camera sensors 213 may capture video images of the robot's surroundings in which an object 215 is present. A computer system of the robot 210 may process the images, identify the object 215 within the images, determine the parameters that enable the robotic hand 212 to grasp the object 215, and execute the grasp attempt.

FIG. 2 also depicts an example process 270 that the robot 210 uses to grasp an object 215. In the process 270, the robot 210 receives input sensor data 260 from its sensors 213. The sensor data 260 may include 2D images captured by one or more cameras, processed or captured 3D depth data, data from a LIDAR system, force sensor data, IR detector data, contact sensor data, proximity sensor data, or other data form a sensor 213 of the robot 210.

In some cases, based on the sensor data 260, the robot 210 may identify an object 215 in its surrounding that it will attempt to grasp. For example, the robot 210 may identify the object 215 by analyzing 2D image data captured by one or more video cameras on the robot 210. To analyze the data, a computing system of the robot 210 may filter the data, process the data, or apply to the data various computing algorithms to identify the object 215.

In some implementations, sensor data 260 collected by sensors 213 on the robot 210 may be input to a classification module 272. The sensor data 260 input to the classification module 272 may be preprocessed by a computing system of the robot 210, for example, it may be truncated, downsampled, or otherwise processed. The classification module 272 processes the input sensor data 260 to identify and classify the object 215 that the robot 210 will grasp. For example, one or more raw or processed images captured by a camera 213 of the robot 210 may be input to a classification module 272, which then detects the object 215 in the one or more images and categorizes the object into a known classification. The classification may be categories of objects known to the robot 210. For instance, the object may be classified as a writing implement, a cup, a chair, a book, a phone, or other object class. In some cases, the classification may identify the specific object (e.g., Tom's phone).

In some implementations, the classification module 272 or another computing system of the robot 210 may generate from the image sensor data 260 a bounding-box that surrounds the object. The bounding box may indicate the contours of the object 215 in 2D space and may provide the robot 210 information regarding the size and dimensions of the object 215. In some implementations, the image sensor data 260 may be combined with depth data to determine the size and shape of the object 215 in three dimensions. For example, the sensor data 260 may include image data from multiple angles that may be processed to determine the depth of various parts of the object 215, or the sensor data may include LIDAR data or other data that provides a measurement of the depth of the object 215. In some implementations, some or all of the functions completed by the classification module 272 may be implemented as neural networks.

In example 200, the classification module 272 accepts as input sensor data 260 that includes images of the surroundings of the robot 210, identifies the nearby object 215, and determines that the object 215 is classified as a "cup."

In some implementations, based on raw or processed sensor data 260, a location processing module 274 determines the location and orientation of the object 215 in 3D space. This position or pose of the object 215 can be a six-dimensional (6D) pose, signifying that the position of the object 215 can fully specify the position of the object 215 (e.g., for three translational axes x, y, and z) and orientation of the object 215 (e.g., for three rotational axes yaw, pitch, and roll). Depending on the implementation, the location processing module 274 may determine a grasp type that is appropriate for the determined pose of the object 215. The location processing module 274 may receive the output of the classification module 272 as input in order to determine a grasp type.

In some implementations, the location processing module 274 may use data in addition to the sensor data to determine the location of the object 215 and the 6D pose. For example, the location processing module 274 may use the classification of the object to look up a three-dimensional model of the object. This can be used to provide information about areas of the object that may be occluded. As another example, information indicating a likely structure or material for the object 215 can be acquired from a database. The composition of the object 215 may be useful to determine how much force the object 215 can withstand. Other information, such as a center of gravity of the object 215 or other objects of the same type, may also be helpful to a grasp model or location processing module.

Based on the classification of the object 215 and the pose of the object 215, the robot 210 may use a neural network grasp model 276 to determine grasp parameters for grasping the object 215. For example, based on the classification of the object 215 (e.g., the object type), sensor data describing observed characteristics of the object 215, and the pose of the object 215, the grasp model 276 can output data indicating a bounding region on an image representing an area where the robotic hand 212 of the robot 210 should contact the object 215. The bounding region may be specified as, for example, a set of two-dimensional coordinates with respect to an image captured by a camera of the robot 210. As another example, the bounding region may be specified as coordinates in a 3D coordinate system to define a 3D volume representing contact portions of the object 215.

In some implementations, the grasp model 276 takes into account the features of the robotic hand 212 and the object 215 to determine and/or output the various grasp parameters to cause the robotic hand 212 to attempt to grasp the object 215. The grasp parameters may specify, for example, among others, the planned motion (direction and extent) or rotation of various components (e.g., the fingers) of the robotic hand 212, the target force or pressure value to be detected by sensors 213 on the robotic hand 212 during the grasp attempt, or the expected time and duration of contact. In some implementations, the grasp parameters may include predictions of sensor values over time, for example, the predicted force detected versus time profile for the duration of the grasp.

In the process 270, the grasp parameters may be routed to a control module 278 that determines and executes the motor commands necessary to cause the robotic hand 212 to execute the grasp. The commands may be, for example, electronic control signals (e.g., voltages, currents, or resistances) that trigger various mechanical components, motors, or other actuators that cause components of the robotic hand 212 to move. In some implementations, the control module 278 may receive input from one or more sensors 213 during the grasp. For example, the control module 278 may receive data from a force sensor on a finger of the robotic hand 212 throughout the duration of the grasping action. The control module 278 may use the sensor data to adjust the commands sent to the robotic hand 212 to execute the grasp. For example, the control module 278 may command the fingers of the robotic hand 212 to close around the object 215 until a force sensor on a finger of the robotic hand 212 registers a certain target level of force, at which point the control module 278 may determine that the robotic hand 212 has a stable grip on the object 215 and it may cease closing the fingers.

In some implementations, the robot 210 records sensor data 260 throughout (e.g., before, during and after) the grasp attempt and stores this sensor data 260 as grasp attempt sensor data 262. Recording of the grasp attempt sensor data 262 may be initiated before the start of the grasp (e.g., when the robot determines that a grasp should be performed and grasp processing initiated), continue while the robot 210 executes the grasping motion, and stop a predetermined amount of time (e.g., 1 second, 5 seconds, etc.) after the grasping motion is complete or the grasped object is released. In some implementations, the initiation and termination of sensor data 262 recording may be triggered by a signal in a computer system of the robot 210.

The grasp attempt sensor data 262 may include data from various sensors. For example, the grasp attempt sensor data 262 may include camera frames 264 that capture video images of the robotic hand 212 attempting to grasp the object 215. The grasp attempt sensor data 262 may also include force versus time data 266 and contact sensor versus time data 268 captured for the duration of the grasp attempt. The grasp attempt sensor data 262 may also include various other recorded by sensors 213 on the robot 210 during the grasp attempt. For example, the grasp attempt sensor data 262 may include data from accelerometers, proximity sensors, gyroscopes, or other sensors 214 located on the robot 210.

Figure 3:
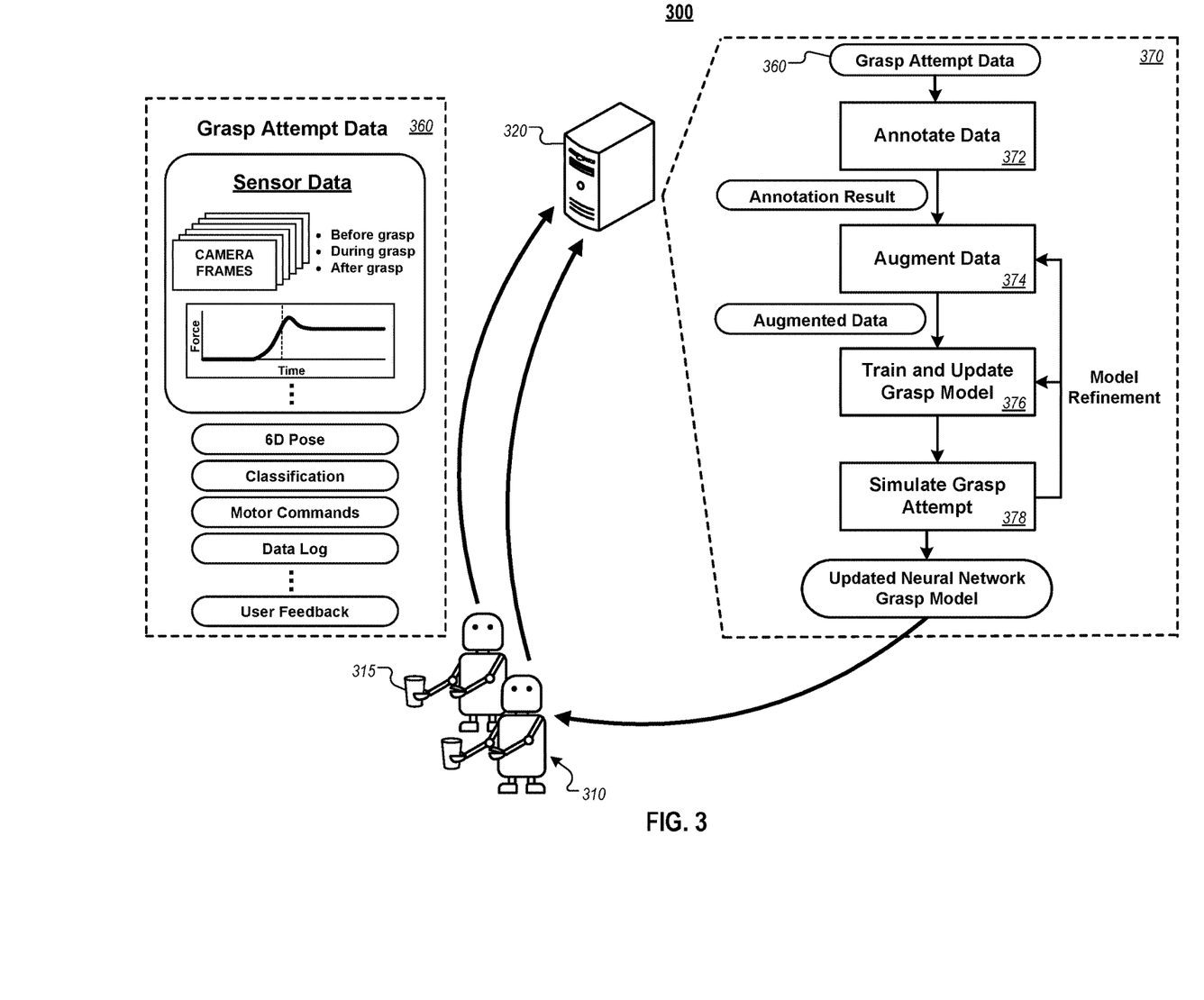
FIG. 3 is a diagram that illustrates an example system for robot grasp learning.

FIG. 3 is a diagram that illustrates an example system 300 for robot grasp learning through shared retrospective analysis and simulation of grasp attempts. In FIG. 3, one or more robots send data related to one or more grasp attempts to a server system for retrospective analysis and simulation. The server system annotates the data, trains and updates a neural network grasp model using the annotated data. In some examples, the server system may augment the data prior to updating the grasp model. The server system may simulate the grasp attempt using the updated grasp model to verify that the updated model provides improved grasp performance over the previous model. In some cases, the server system may iterate the process one or more times, augmenting the data, training the model, and verifying the updated model in repeated cycles. When the server system determines that it has generated a final updated neural network grasp model, it then distributes the updated model to the one or more robots.

In example system 300, the server system 320 receives grasp attempt data 360 from one or more robots 310 that attempted to grasp an object 315. The grasp attempt data 360 may include sensor data from one or more sensors of the robot 310 recording during the grasp attempt. For example, the grasp attempt data 360 may include video images captured before, during, and after the grasp that show the robotic hand of the robot 310 attempting to grasp the object 315. The grasp attempt data 360 may also include force, pressure, IR, contact, or other sensor data recorded throughout the grasp attempt. The robot 310 may also send to the server system 320 grasp attempt data 360 that includes the 6D pose determined by the location processing module of the robot 310 that was used for the grasp, the classification of the object 315 determined by the classification module of the robot 310, the set of grasp commands generated by the control module of the robot 310 to execute the grasp, and a log of other data recorded or generated during the grasp. In some implementations, the robot 310 may send to the server system 320 feedback from a human user regarding the grasp attempt. For example, a user who viewed the grasp attempt by the robot 310 may label the attempt as a success or a failure, or may provide additional description of the grasp attempt, for instance, whether the attempt resulted in a stable hold.

After receiving the grasp attempt data 360, the server system 320 retrospectively analyzes and simulates the failed grasp attempts, where process 370 depicts one example analysis and simulation process that the server system 320 may perform. In process 370, after receiving the grasp attempt data 360 from the one or more robots 310, the server system 320 annotates the data 360, generating an annotation result (372). In some implementations, the server system 320 generates the annotation result by analyzing one or more data sets from the grasp attempt data 360. For example, the server system 320 may analyze force sensor data recorded during the grasp attempt to determine the timestamp of first contact between the robotic hand of the robot 310 and the object 315 and the last timestamp of contact (e.g., when the robot 310 dropped the object 315). The server system 320 may then correlate these timestamps with video images of the grasp attempt and annotate the grasp attempt data 360 to denote the timestamp of first and last contact. The server system 320 may annotate the grasp attempt data 360 in a variety of other ways. For example, the server system 320 may associate the data with the class of the object 315, or the 6D pose used by the robot 310 during the grasp attempt.

In some implementations, the server system 320 may annotate the data 360 by labeling the attempt as successful or failed based on analysis of the grasp attempt data 360. For example, the server system 320 may analyze video images captured during the grasp attempt to determine that the robot 310 dropped the object 315, or disturbed neighboring objects during the grasp attempt, both of which would be labeled a failed grasp.

In some cases, the server system 320 may annotate the grasp attempt data 360 by labeling the attempt as successful or failed based on information received from a human user. For example, the server system 320 may receive, in addition to the sensor data, feedback from a human user who viewed the grasp attempt. The user may have viewed the grasp attempt as it was occurring, or he may have viewed a video recording of the grasp attempt. The user may provide feedback to the server system 320 that indicates whether the grasp was a success or failure. The server system 320 may use the user feedback to annotate the grasp attempt data 360 as either successful or failed. In some implementations, the server system 320 may annotate the grasp attempt data 360 using other feedback from a user. For example, the user may provide feedback that indicates that the grasp attempt resulted in a stable hold, a precarious hold, or an overly-firm hold, and the server system 320 may annotate the grasp attempt data 360 accordingly.

In some implementations, the server system 320 may annotate the grasp attempt data 360 based on information received from an external source other than a human user. For example, the server system 320 may receive data from another computer system, where that computer system may be, for instance, a database or database server that stores information about the object 315. The server system 320 may annotate the data 360 based on information about the object 315 received from the database server. For example, the server system 320 may receive information from a database server that describes the dimensions, material, and mass distribution of the object 315. The server system 320 may then annotate the data 360 with this information about the object 315 that the robot 310 attempted to grasp.

In some implementations, after annotating the grasp attempt data 360, the server system 320 may augment some or all of the grasp attempt data 360 before using it to train the grasp model (374). For example, the server system 320 may filter or preprocess video image data or other data sets of the grasp attempt data 360. In some implementations, the server system 320 may add or subtract noise from some or all of the grasp attempt data 360, to evaluate the robustness of the grasp model for data of varying quality. In some implementations, the server system 320 may systematically modify some or all of the grasp attempt data 360 to emulate different grasp conditions. For example, the server system 320 may reduce the intensity for all pixels within the video images to emulate a grasp attempt in a low-light scenario. In some implementations, the server system 320 may omit the augmentation step (374).

After augmenting the data if desired, the server system 320 may use the grasp attempt data 360, the augmented data, and/or the annotation result to train a grasp model (376). In some implementations, the grasp model may be a neural network model. The grasp model may be the same grasp model implemented in the robot 310 and may determine parameters that enable the robot 310 to attempt to grasp the object 315. The grasp parameters may include, for example, the planned motion (direction, extent, rotation) of various components of the robot during the grasp attempt, predicted or desired sensor (e.g., force, pressure, contact) values or profiles detected during all or some of the grasp attempt, or other parameters that enable the robot 310 to grasp the object 315.

The server system 320 may train and update the grasp model by using any of various computer-implemented training techniques. For example, the server system 320 may train the grasp model using machine learning or deep learning techniques. Based on training the grasp model, the server system 320 may update the grasp model. In some implementations, updating the grasp model may involve determining new synaptic weights, node connectivity, or other neural network parameters of the grasp model.

After training the grasp model, the server system 320 may simulate a grasp attempt with the updated grasp model by using the received or augmented grasp attempt data 360 (378). In some implementations, the server system 320 may simulate a grasp by feeding data 360 from a failed grasp attempt into the updated grasp model. Based on the results of the simulation, the server system 320 may determine that, though the current grasp model implemented in the robot 310 resulted in a failed grasp, the updated grasp model resulted in a successful grasp attempt.

In some implementations, the server system 320 may iterate all or part of the process 370 to refine and/or verify the updated grasp model. For example, after updating and verifying the grasp model with one set of grasp attempt data 360, the server system 320 may simulate and verify the updated grasp model using another, different set of grasp attempt data 360. In some implementations, the server system 360 may augment the grasp attempt data 360 it used to update the grasp model then retrain and/or re-simulate the grasp attempt using the augmented data. For example, the server system 360 may add randomness to the grasp attempt sensor data 360 used to train the updated grasp model, then re-simulate the grasp attempt to evaluate the robustness of the updated model in the presence of noise.

After simulating and verifying the updated grasp model, the server system 320 may distribute the updated grasp model to one or more robots 310. In some implementations, the server system 320 may send the updated grasp model to the robots 310 through a network. The robots 310 may replace the current version of their grasp model with the updated grasp model. In some implementations, a robot 310 may receive an updated grasp model from the server system 320 that was trained on grasp attempt data 360 sent by a different robot 310. Here, the robots 310 may contain the same hardware and software for a grasp, and one robot 310 may learn from grasps attempted by another similar robot 310, thus enhancing the speed and fidelity of the learning process.

Figure 4:
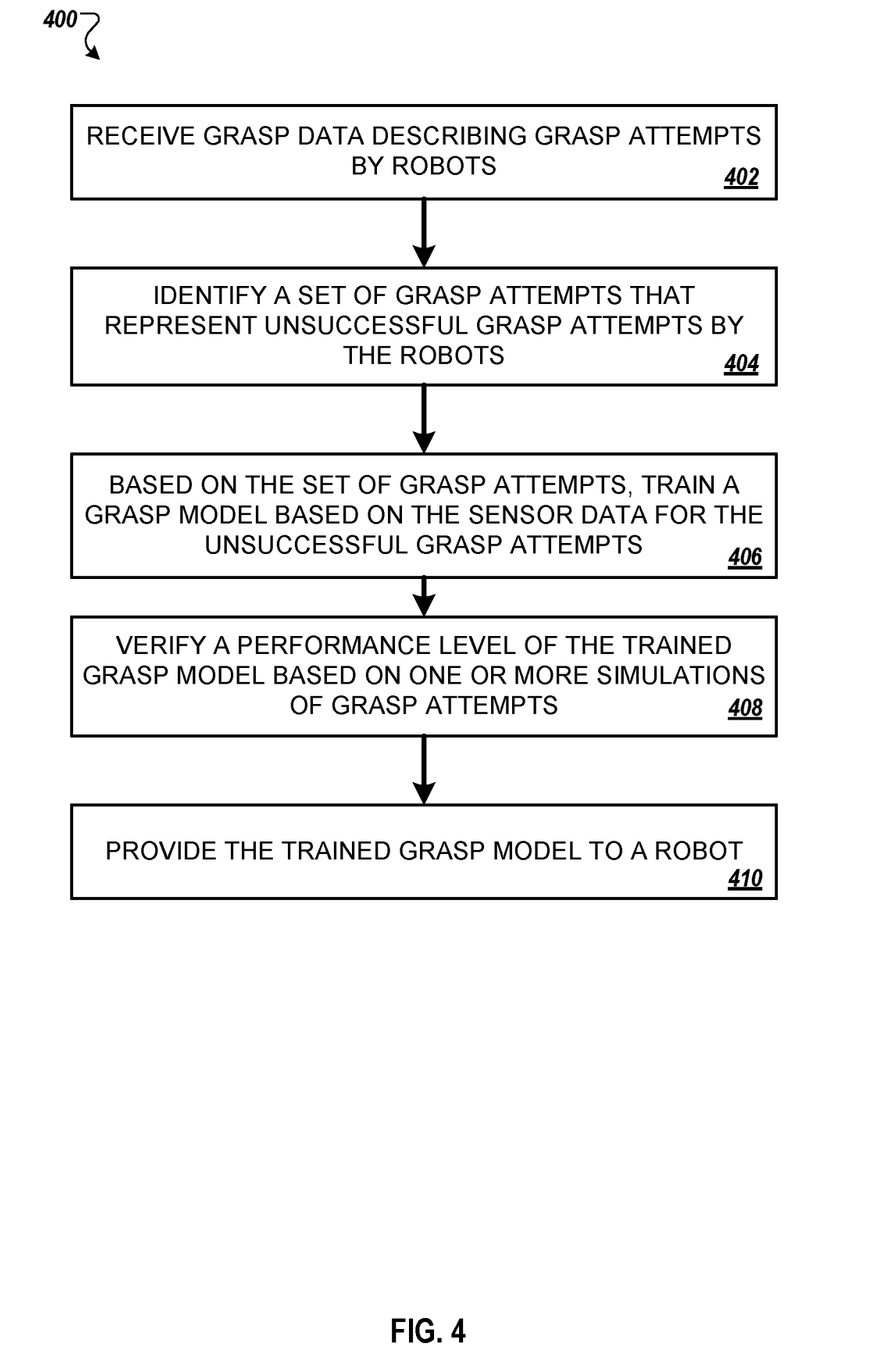
FIG. 4 is a flow chart that illustrates a process for robot grasp learning.

FIG. 4 is a flow chart that illustrates a process 400 for robot grasp learning. The process 400 is described below as being performed by a server system, but can be performed by any appropriate computing device or combination of computing devices.

The server system receives grasp data describing grasp attempts by robots (402). The grasp data includes, for each grasp attempt, (i) sensor data from a robot that describes an attempt of the robot to grasp an object and (ii) an indication of a type of grasp attempted by the robot. In some examples, the server system may receive grasp data from each of multiple robots that use a same grasp model.

In some implementations, the sensor data that describes a grasp attempt may include one or more images captured during the grasp attempt, video data showing the grasp attempt, audio data indicating sounds occurring during the grasp attempt, force sensor readings occurring during the grasp attempt, lidar data captured during the grasp attempt, or radar data captured during the grasp attempt. In some implementations, the grasp attempt data may include metadata indicating outputs of one or more models of the robot, a trajectory or path the robot determined for reaching the object to be grasped, one or more scores indicating an evaluation of grasp characteristics by the robot, or an estimated pose of the object to be grasped that is determined by the robot.

In some implementations, the grasp data may include an indication of outputs of the grasp model for each of the grasp attempts. The grasp model may be, for example, a convolutional neural network or other deep or machine learning architecture. In some examples, the grasp model may be configured to process input data comprising feature values derived from sensor observations of an object and to provide output indicating (i) a grasp type selected from among multiple types of grasps and (ii) a region for contact with the object when grasping the object. In some examples, the model may indicate the region for contact by specifying a bounding box on an image of the object. The bounding box may, for example, indicate the contour of the object in 2D or 3D space. In some implementations, the grasp data may include, for each of the grasp attempts, the grasp type and the bounding box determined by the grasp model.

In some examples, the grasp data may include other outputs of the grasp model, such as the planned motion (direction and extent) or rotation of various components (e.g., the fingers) of the robotic hand, the target force or pressure values for sensors on the robotic hand during the grasp attempt, or the expected time and duration of contact. In some implementations, the grasp data may include predictions or measurements of sensor values over time, for example, the predicted force detected versus time profile for the duration of the grasp. The grasp data may include an indication of whether the grasp was successful and a characterization or analysis of the success or failure.

In some implementations, the sensor data for each of the grasp attempts may include data that indicates a position of the object grasped before and after the grasp attempt, for example, image data that shows the location of the object before and after the grasp attempt. In some implementations, the data may include readings acquired by the sensors of the robot during the attempt to grasp the object, for example, readings of force, contact, or pressure values experienced by sensors on the robot during the grasp attempt.

The server system identifies a set of the grasp attempts that represent unsuccessful grasp attempts by the robots (404). For example, the server system can evaluate the grasp data for a grasp attempt and determine whether one or more conditions are present that would indicate failure, e.g., the target object is not grasped or contacted, the object was contacted but not lifted, the object slips out of the grasp before the robot acted to release the object, the grasp deforms or otherwise damages the object, an incorrect object is grasped, the robot disturbs or displaces one or more other objects during the grasp attempt, etc. In some examples, the server system may determine an object was not grasped because a pattern of force, pressure, or contact sensors does not represent a stable grasp. Similarly the server system can evaluate feedback from a human user, such as voice commands or other utterances during or following the grasp attempt (for example, a repeated instruction by the user to perform the grasp, or an instruction by the user to abort the grasp attempt), to determine whether the user considered the grasp unsuccessful.

The server system trains a grasp model based on the sensor data for the unsuccessful grasp attempts (406). For example, the server system can update the parameters of a neural network grasp model based on the examples indicated by the grasp data. In some implementations, training the grasp model includes updating the training of the grasp model used be each of the multiple robots to generate an updated grasp model.

After training the grasp model, the server system verifies a performance level of the trained grasp model (408). The server system perform simulations of grasp attempts by generating inputs for the trained grasp model from the sensor data for one or more unsuccessful grasp attempts, and evaluating outputs that the trained grasp model produces in response. The server system can then verify whether the trained grasp model provides grasp parameters that are better than those that were used in the prior unsuccessful grasp attempt. For example, the server system may assess the accuracy of a bounding box for contact with the object. As another example, the server system may compare the output of the updated grasp model generated using the received sensor data for a particular, unsuccessful grasp attempt with the output of the grasp model indicated by the received grasp data for that grasp attempt.

In some implementations, the server system may verify the performance of the trained grasp model by simulating grasp attempts, with grasp characteristics determined using the trained grasp model, for grasping a same object in a same environment as a particular unsuccessful grasp attempt described by the received grasp data. Based on the results of the simulation, the server system may then determine that the trained grasp model is more likely to produce a successful grasp than the particular attempt indicated in the received grasp data.

In some implementations, the server system may verify the performance of the trained grasp model by determining, from the sensor data for a particular unsuccessful grasp attempt, parameters that describe the environment or a relationship between the robot and the target object. The server system may then alter those parameters and simulate the grasp attempt using the trained model and the altered parameters, evaluating the likelihood of success of the simulated grasp attempt.

In some implementations, the server system may verify the performance of the trained grasp model by altering the sensor data for a particular unsuccessful grasp attempt. For example, the server system may degrade the quality of the sensor data, introduce noise or randomness, increase error or variation in the sensor data, apply one or more image transformations to image data of the sensor data, at least partially occlude a target object to be grasped, change relative positions of objects described by the sensor data, or change a position of the target object relative to a robot. The server system may then simulate a grasp attempt using the trained grasp model and the altered sensor data, evaluating the likelihood of success of the simulated grasp attempt.

In some implementations, the server system may determine, based on simulations of grasp attempts using the trained model, that the trained grasp model does not provide at least a minimum level of performance (e.g., does not improve the grasp performance compared to the grasp model prior to training). In this case, the server system may continue to train the grasp model.

After verifying the performance level of the trained grasp model, the server system provides the trained grasp model to one or more robots (410). For example, the trained grasp model can be distributed to multiple robots in a fleet as a replacement for a previous version of the grasp model, possibly providing an instruction to replace the previous grasp model of the multiple robots with the trained grasp model.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) display, for displaying information to the user and touchscreen, buttons, a keyboard, or other input device by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
   receiving, by the one or more computers, grasp data describing grasp attempts by robots, wherein the grasp data includes, for each grasp attempt, (i) sensor data, generated using one or more sensors of a robot, that was used by the robot to generate input to a grasp model whose output was used by the robot in an attempt to grasp an object and (ii) an indication of a type of grasp attempted by the robot;
   identifying, by the one or more computers, a set of the grasp attempts that represent unsuccessful grasp attempts by the robots;
   based on the set of grasp attempts representing the unsuccessful grasp attempts, training, by the one or more computers, a grasp model based on the sensor data for the unsuccessful grasp attempts;
   after training the grasp model based on the sensor data for the unsuccessful grasp attempts, verifying, by the one or more computers, that the trained grasp model provides better performance than the grasp model used for the unsuccessful grasp attempts based on one or more computer simulations of grasp attempts, wherein the one or more computer simulations involve (i) providing, to the trained grasp model, input derived from the sensor data that was used to generate input to the grasp model for one or more of the unsuccessful grasp attempts indicated in the received grasp data, and (ii) obtaining output that the trained grasp model generates in response to receiving the input derived from the sensor data corresponding to the one or more of the previous unsuccessful grasp attempts indicated in the received grasp data; and
   in response to verifying that the trained grasp model provides better performance than the grasp model used for the unsuccessful grasp attempts, providing, by the one or more computers, the trained grasp model to a robot.

2. The method of claim 1, wherein receiving the grasp data comprises receiving grasp data, over a communication network, from each of multiple robots that use a same grasp model, wherein the grasp data includes an indication of outputs of the grasp model for each of the grasp attempts;
   wherein training the grasp model comprises updating the training of the grasp model used by each of the multiple robots to generate an updated grasp model; and wherein verifying that the trained grasp model provides better performance than the grasp model used for the unsuccessful grasp attempts comprises, for a particular unsuccessful grasp attempt indicated by the received grasp data, comparing (i) output of the updated grasp model generated using the sensor data for the particular grasp attempt with (ii) output of the grasp model indicated by the received grasp data for the particular grasp attempt.

3. The method of claim 1, wherein the grasp model is configured to process input data comprising feature values derived from sensor observations of an object and to provide output indicating (i) a grasp type selected from among multiple types of grasps and (ii) a region for contact with the object when grasping the object.

4. The method of claim 3, wherein, to indicate a region for contact with an object, the grasp model is configured to output data specifying a bounding box on an image of the object; and
wherein the grasp data includes, for each of the grasp attempts, the grasp model output indicating the grasp type and the bounding box.

5. The method of claim 1, wherein the grasp model comprises a convolutional neural network.

6. The method of claim 1, wherein, for each of the grasp attempts, the sensor data for an attempt to grasp an object includes sensor data, acquired by sensors of the robot attempting the grasp, that indicates a position of the object grasped before and after the grasp attempt.

7. The method of claim 6, wherein the sensor data for the attempt to grasp the object indicates one or more sensor readings acquired by the robot attempting the grasp during the attempt to grasp the object.

8. The method of claim 1, wherein verifying that the trained grasp model provides better performance than the grasp model used for the unsuccessful grasp attempts comprises:
simulating a grasp attempt, with grasp characteristics determined using the trained grasp model, for grasping a same object in a same environment as a particular grasp attempt described by the grasp data; and
determining that the simulated grasp attempt is more likely to produce a successful grasp than the particular grasp attempt indicated in the received grasp data.

9. The method of claim 1, wherein verifying that the trained grasp model provides better performance than the grasp model used for the unsuccessful grasp attempts comprises:
determining, from the sensor data for a particular grasp attempt that is an attempt of a robot to grasp a target object in an environment, parameters describing the environment or a relationship between the robot and the target object;
altering the parameters describing the environment or a relationship between the robot and the target object;
simulating a grasp attempt of a robot, using grasp characteristics determined using the trained grasp model, to grasp the target object from an altered environment based on the altered parameters describing the environment or altered relationship between the robot and the target object; and
evaluating a likelihood of success of the simulated grasp attempt.

10. The method of claim 1, wherein verifying that the trained grasp model provides better performance than the grasp model used for the unsuccessful grasp attempts comprises:

altering sensor data for a particular grasp attempt to:
degrade the quality of the sensor data,
introduce noise or randomness,
increase error or variation in the sensor data,
apply one or more image transformations to image data of the sensor data,
at least partially occlude a target object to be grasped,
change relative positions of objects described by the sensor data, or
change a position of the target object relative to a robot; and
simulating a grasp attempt of the target object by a robot by providing, to the trained grasp model, input derived from the altered sensor data for the particular grasp attempt; and
evaluating grasp characteristics that the trained grasp model provides in response to receiving the altered sensor data for the particular grasp attempt.

11. The method of claim 1, further comprising:
training the grasp model;
determining, based on simulations of grasp attempts using the trained grasp model that are carried out based on the sensor data for the unsuccessful grasp attempts, that the trained grasp model does not provide at least a minimum level of performance; and
based on determining that the trained grasp model does not provide at least the minimum level of performance, continuing to train the grasp model.

12. The method of claim 1, comprising providing the trained grasp model to each of multiple robots with an instruction to replace a previous grasp model of the multiple robots with the trained grasp model.

13. The method of claim 1, wherein the sensor data for a grasp attempt includes (i) one or more images captured during the grasp attempt or video data captured during the grasp attempt, and (ii) one or more force sensor readings occurring during the grasp attempt.

14. The method of claim 1, wherein the grasp data for a grasp attempt includes metadata indicating outputs of one or more models of the robot, a trajectory or path the robot determined for reaching the object to be grasped, or an estimated pose of the object to be grasped that is determined by the robot.

15. A system comprising:
one or more computers; and
one or more computer-readable media storing instructions that, when executed by the one or more computers, cause the one or more computers to perform operations comprising:
receiving, by the one or more computers, grasp data describing grasp attempts by robots, wherein the grasp data includes, for each grasp attempt, (i) sensor data, generated using one or more sensors of a robot, that was used by the robot to generate input to a grasp model whose output was used by the robot in an attempt to grasp an object and (ii) an indication of a type of grasp attempted by the robot;
identifying, by the one or more computers, a set of the grasp attempts that represent unsuccessful grasp attempts by the robots;
based on the set of grasp attempts representing the unsuccessful grasp attempts, training, by the one or more computers, a grasp model based on the sensor data for the unsuccessful grasp attempts;
after training the grasp model based on the sensor data for the unsuccessful grasp attempts, verifying, by the one or more computers, that the trained grasp model provides better performance than the grasp model used for the unsuccessful grasp attempts based on one or more computer simulations of grasp attempts, wherein the one or more computer simulations involve (i) providing, to the trained grasp model, input derived from the sensor data that was used to generate input to the grasp model for one or more of the unsuccessful grasp attempts indicated in the received grasp data, and (ii) obtaining output that the trained grasp model generates in response to receiving the input derived from the sensor data corresponding to the one or more of the previous unsuccessful grasp attempts indicated in the received grasp data; and in response to verifying that the trained grasp model provides better performance than the grasp model used for the unsuccessful grasp attempts, providing, by the one or more computers, the trained grasp model to a robot.

16. The system of claim 15, wherein receiving the grasp data comprises receiving grasp data, over a communication network, from each of multiple robots that use a same grasp model, wherein the grasp data includes an indication of outputs of the grasp model for each of the grasp attempts;

wherein training the grasp model comprises updating the training of the grasp model used by each of the multiple robots to generate an updated grasp model; and wherein verifying that the trained grasp model provides better performance than the grasp model used for the unsuccessful grasp attempts comprises, for a particular unsuccessful grasp attempt indicated by the received grasp data, comparing (i) output of the updated grasp model generated using the sensor data for the particular grasp attempt with (ii) output of the grasp model indicated by the received grasp data for the particular grasp attempt.

17. One or more non-transitory computer-readable media storing instructions that, when executed by one or more computers, cause the one or more computers to perform operations comprising:

receiving, by the one or more computers, grasp data describing grasp attempts by robots, wherein the grasp data includes, for each grasp attempt, (i) sensor data, generated using one or more sensors of a robot, that was used by the robot to generate input to a grasp model whose output was used by the robot in an attempt to grasp an object and (ii) an indication of a type of grasp attempted by the robot;

identifying, by the one or more computers, a set of the grasp attempts that represent unsuccessful grasp attempts by the robots;

based on the set of grasp attempts representing the unsuccessful grasp attempts, training, by the one or more computers, a grasp model based on the sensor data for the unsuccessful grasp attempts;

after training the grasp model based on the sensor data for the unsuccessful grasp attempts, verifying, by the one or more computers, that the trained grasp model provides better performance than the grasp model used for the unsuccessful grasp attempts based on one or more computer simulations of grasp attempts, wherein the one or more computer simulations involve (i) providing, to the trained grasp model, input derived from the sensor data that was used to generate input to the grasp model for one or more of the unsuccessful grasp attempts indicated in the received grasp data, and (ii) obtaining output that the trained grasp model generates in response to receiving the input derived from the sensor data corresponding to the one or more of the previous unsuccessful grasp attempts indicated in the received grasp data; and in response to verifying that the trained grasp model provides better performance than the grasp model used for the unsuccessful grasp attempts, providing, by the one or more computers, the trained grasp model to a robot.

18. The method of claim 1, comprising augmenting or altering the sensor data for a particular unsuccessful grasp attempt;

wherein verifying that the trained grasp model provides better performance than the grasp model used for the unsuccessful grasp attempts based on one or more simulations of grasp attempts comprises verifying that the trained grasp model provides better performance than the grasp model used for the unsuccessful grasp attempts based on one or more simulations that involve providing, to the trained grasp model, input derived from the augmented or altered sensor data for the particular unsuccessful grasp attempt.

19. The method of claim 18, wherein verifying that the trained grasp model provides better performance than the grasp model used for the unsuccessful grasp attempts based on one or more simulations of grasp attempts comprises comparing (i) output of the trained grasp model generated in a simulation using the received sensor data for a particular grasp attempt that was unsuccessful with (ii) output of the grasp model that was previously used to actually carry out the particular grasp attempt that was unsuccessful.

20. The method of claim 1, wherein the grasp data includes data provided over a computer network from multiple different robots in a fleet of robots each having a locomotion system to move the robot from place to place.

* * * * *